CONTROL APPARATUS FOR TELEVISION RECIEVER

Filed Sept. 13, 1962

2 Sheets-Sheet 1

Jan. 25, 1966 S. P. RONZHEIMER 3,231,669

CONTROL APPARATUS FOR TELEVISION RECIEVER

Filed Sept. 13, 1962 2 Sheets-Sheet 2

United States Patent Office 3,231,669
Patented Jan. 25, 1966

3,231,669
CONTROL APPARATUS FOR TELEVISION RECEIVER
Stephen P. Ronzheimer, Elmhurst, Ill., assignor to Hazeltine Research Inc., a corporation of Illinois
Filed Sept. 13, 1962, Ser. No. 223,494
12 Claims. (Cl. 178—7.3)

The present invention relates to control apparatus for a television receiver. More particularly, it relates to such apparatus useful in a television receiver for improving black level operation at the image-reproducing device.

Several difficulties arise when D.-C. coupling is used in conjunction with conventional types of AGC circuits which derive AGC from the peak of the synchronizing pulses. In a typical form D.-C. coupling in a television receiver, the video detector is D.-C. coupled to the video amplifier grid, and the video amplifier plate is D.-C. coupled to the picture tube cathode. Conventional time-gated, i.e. keyed, AGC circuits respond to the signal at the video amplifier plate during the horizontal synchronizing interval and use the peaks of the synchronizing pulses as the reference level in establishing AGC. Thus, whenever any condition arises which would tend to cause a variation in amplitude in the signal at the video amplifier plate, the AGC circuit introduces a counteracting gain change which will keep the instantaneous voltage of the synchronizing pulse peaks at a relatively constant level. Even though changes in video signal amplitude may occur, the synchronizing peaks are maintained at a constant D.-C. level.

Some of the conditions which result in changes in signal amplitude at the video amplifier plate are differences in radio-frequency signal level from different stations, variations in contrast setting, and variations in receiver fine tuning adjustment. For example, if the contrast control is of the type located in the cathode or screen circuit of the video amplifier, changes in control setting will effect changes in the peak-to-peak signal amplitude at the video amplifier plate, but the AGC circuit will function in such a manner that the plate potential corresponding to synchronizing pulse peaks is maintained nearly constant. Thus, by maintaining synchronizing pulse peaks at a constant potential, while, at the same time, changing the video signal amplitude, a change in blanking level occurs. Blanking level and black level in the television signal are nearly the same, differing by a small fixed amount referred to in the art as "setup." Therefore, with D.-C. coupling, the net result of the foregoing operation is an undesired shift in background brightness. This results because if black level were initially set at beam current cutoff in the picture tube, the shift in black level would obviously result in improper black level operation.

Figures 5A, 5B:
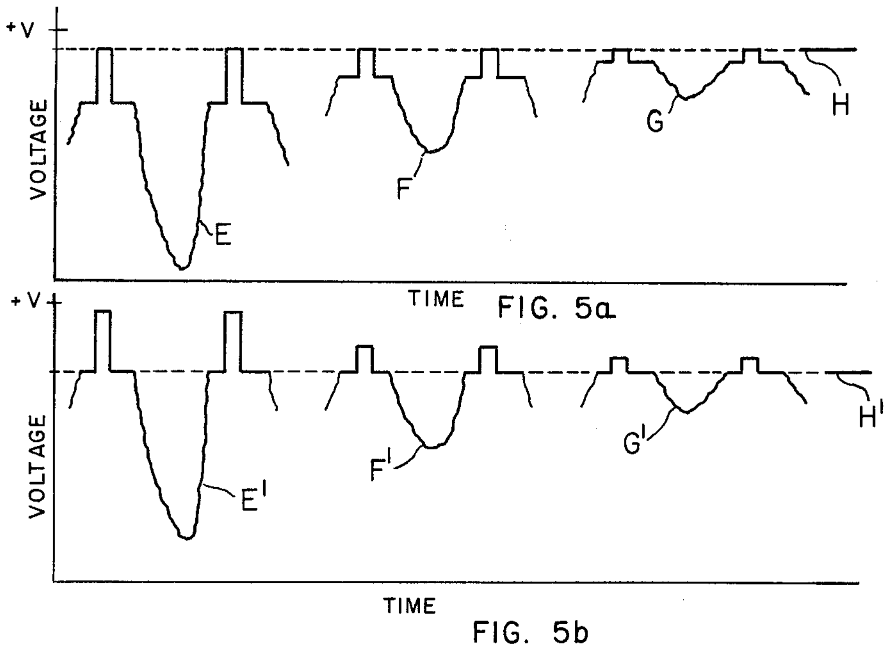

As another example, when the receiver is detuned in the direction to introduce sound interference in the picture, the D.-C. component of the signal at the video amplifier plate gradually increases with detuning due to the detected D.-C. component produced from the sound carrier, but synchronizing pulse peaks are held at a constant level. If the fine tuning range is sufficient, the receiver may detune until the video signal completely disappears, leaving only the D.-C. component due to the resulting sound carrier, and the D.-C. potential at the video amplifier plate would, because of AGC action, be approximately the same as the level of synchronizing pulse peaks if the receiver were properly tuned. In the detuned condition, the D.-C. coupled picture tube is biased well beyond cutoff and is in the "blacker-than-black" condition, exhibiting a blank screen which is not even occasionally lit up by noise pulses. Should the viewer switch to a channel when the fine tuning is mistuned to this degree, he may become alarmed or confused by the lack of any light from the picture tube. If he should turn up the brightness, a blank raster would appear; but then upon correctly tuning the receiver, the picture will be too bright and another adjustment of the brightness control would be required. The effect of mistuning on the black level is illustrated in FIG. 5*a*, waveforms E–H.

As still another example, synchronizing pulse peak amplitude may vary even though the peak amplitude of the composite signal remains constant. These variations supposedly are to be restricted at the transmitter within fairly narrow limits according to Federal Communications Commission rules. However, observations have indicated that transmitters frequently permit synchronizing pulse peak amplitude variations which exceed the specified limits. The present invention minimizes the effects of these variations on black level performance.

While the aforementioned difficulties might be considered tolerable in the sense that proper correction can be made with manual brightness control adjustment, the described variations in black level are highly undesirable and would have poor acceptance by the viewer. It would, therefore, be desirable to maintain black level constant and independent of variations in signal amplitude. A close approach to this idea would be to maintain blanking level constant since, as mentioned, black level and blanking level are nearly the same.

Circuits for using blanking level as a reference instead of sync peaks have been proposed in the prior art but have not received extensive use in home television receivers. Such circuits have been rather complex in a variety of ways. Some have used separate delay multivibrators and/or separate keying pulse generators instead of directly using the horizontal scanning flyback pulse as employed in current practice receivers. Another complex approach is used in "inverted" operation with AGC phase inverter amplifiers and split B supply. An example of the latter is given in the paper entitled "A New Fast Noise Immune Television AGC Circuit," by K. R. Wendt, R.C.A. Review, September 1948, pages 385–393.

To maintain black level constant when synchronizing pulse peak referencing and full D.C. coupling are employed, a flat AGC characteristic is required. However, when AGC is derived from separate, simple means, such as directly from the video detector, a less perfect AGC characteristic is obtained. A method will be described hereinafter by which it is possible to provide black level stabilization even though the AGC characteristic may not be flat.

It is, therefore, an object of the present invention to provide automatic-control apparatus for a television receiver that maintains correct black level operation at the image-reproducing device.

It is another object of the invention to provide a simple type of control apparatus that facilitates accurate reproduction of the television picture signal.

It is a further object of the invention to provide a simple type of control apparatus that makes direct use of the horizontal scanning flyback pulse for keying purposes in a way that permits black to be maintained in the reproduced image.

It is a still further object of the invention to provide a simple type of control apparatus that stabilizes black in the reproduced image in a way that permits AGC to be derived from a simple means having a nonflat characteristic.

Thus, in accordance with the invention, there is provided control apparatus for a television receiver of the type adapted to receive a negative modulation television signal including synchronizing pulses followed by a reference level having an amplitude different from that of the pulses, and having image-reproducing apparatus including a signal-translating channel and an image-reproducing device. The apparatus includes means for supplying at least the reference level of the television signal, and also horizontal deflection signal generating means for supplying flyback pulses. Differential delay means are included for deriving from each of the flyback pulses at least two pulses, wherein the phase of any one derived pulse is delayed with respect to the phase of any other derived pulse. The control apparatus also includes means responsive to the reference level and to each of the differentially delayed pulses for deriving an automatic-control effect for stabilizing the reference level within the image-reproducing apparatus at a level corresponding to that which is required for correct black level operation at the image-reproducing device.

For a better understanding of the present invention, together with other and further objects thereof, reference has been made to the following description, taken in connection with the accompanying drawings, and its scope will be pointed out in the appended claims.

Figure 1:
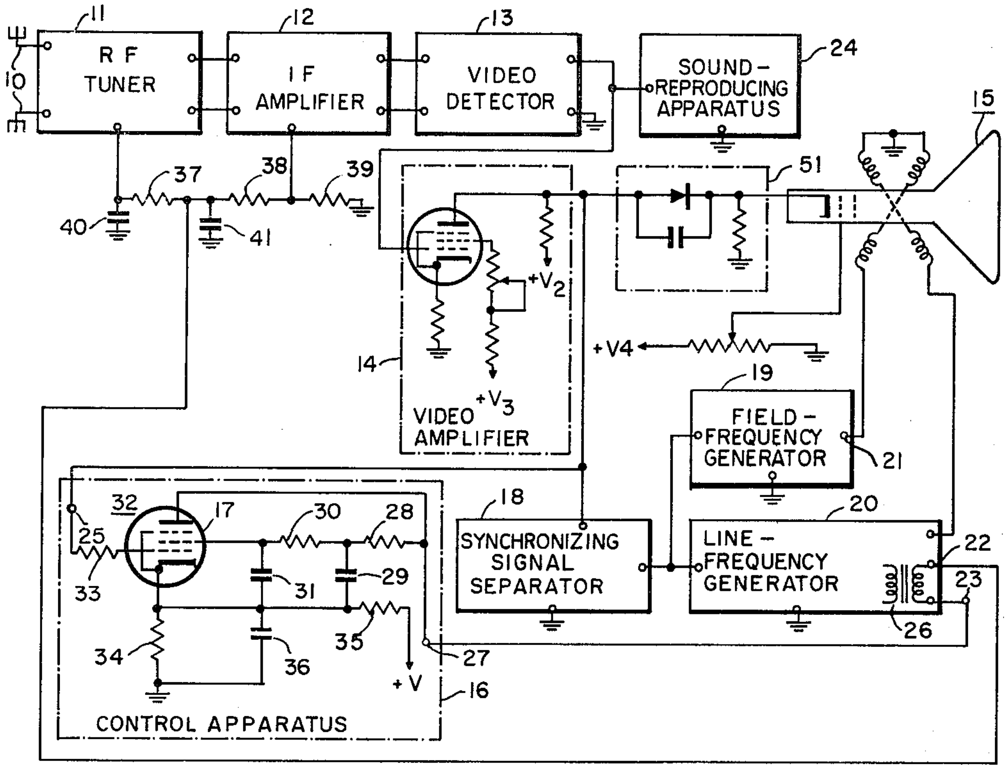
Figure 3:
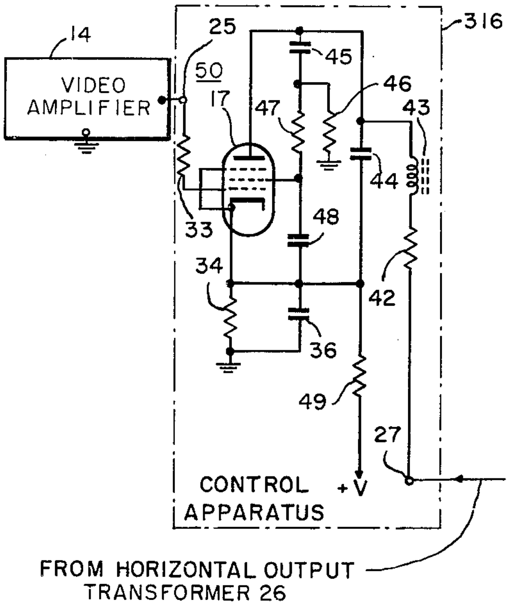
Figure 2:
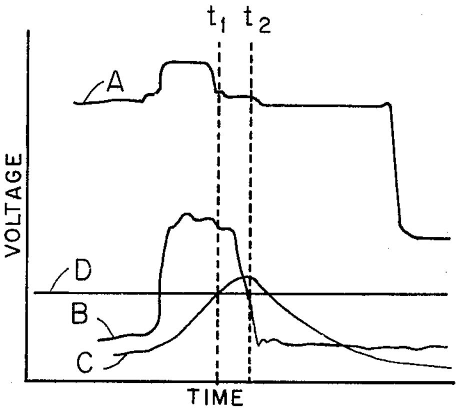
Figure 4:
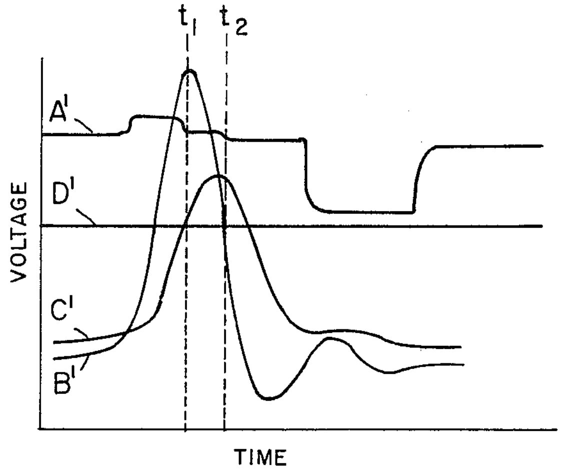

Referring to the drawings:

FIG. 1 is a circuit diagram, partly schematic, of a television receiver embodying automatic-control apparatus in accordance with one form of the present invention;

FIG. 2 comprises graphic representations useful in explaining the operation of the embodiment of FIG. 1;

FIG. 3 is an alternative form of automatic-control apparatus useful in the television receiver of FIG. 1;

FIG. 4 contains graphic illustrations useful in explaining the operation of the embodiment of FIG. 3, and FIGS. *5a* and *5b* are signal waveform graphs useful in explaining the advantage of using the automatic-control apparatus of FIG. 1 or FIG. 3 over the more conventional type of circuitry.

*Receiver system of FIG. 1*

Referring now more particularly to FIG. 1, there is represented a television receiver of the superheterodyne type designed for negative modulation having an antenna system 10 coupled to radio-frequency tuner 11. Coupled to the output terminals of tuner 11, in a cascade fashion and in the order presented, are an intermediate-frequency amplifier 12 of one or more stages, a video detector 13, a video amplifier 14, and a cathode-ray type of image-reproducing device 15, coupled to amplifier 14 through special network 51. This network operates such that for scenes of low or medium average brightness, device 15 is D.-C. coupled to amplifier 14, whereas for scenes for high average brightness, device 15 is A.-C. coupled to amplifier 14. A more complete description is given in copending application Serial No. 215,964, filed Aug. 9, 1962, and entitled "Black Level Stabilization System for a Television Receiver." The invention described hereinafter, however, is not limited to such a coupling arrangement, but could also be used to advantage where D.-C. coupling is employed exclusively.

Control apparatus 16, constructed in accordance with the present invention and to be described in greater detail hereinafter, is also coupled to amplifier 14. Briefly, however, apparatus 16 includes a keyed rectifier circuit having vacuum tube 17 connected in such a manner as to maintain correct level operation at image-reproducing device

15. A synchronizing signal separator 18, having output terminals coupled to field-frequency generator 19 and line-frequency generator 20, is also coupled to amplifier 14. Output terminals 21 and 22 of these generators are connected to the usual field-frequency and line-frequency scanning coils, respectively, to control beam deflection. Another output, 23, of the horizontal scanning system of unit 20 furthermore is coupled to apparatus 16 and provides a pulse to key rectifier 17 and also a path by which the automatic-gain-control signal derived therein is applied to radio-frequency tuner 11 and to one or more of the stages of intermediate-frequency amplifier 12. The path by which the AGC signal is applied to turner 11 and amplifier 12 is not limited to output 23, however, as the invention is adaptable to both shunt and series feed of the keying pulses.

Sound-reproducing apparatus 24 is also connected to the output terminals of detector 13 and may consist of one or more stages of intermediate-frequency amplification, a detector, one or more stages of audio-frequency amplification, and a sound-reproducing device.

It will be understood that the units thus far described, with the exception of apparatus 16, are of conventional construction and well-known in the art, therefore, a further description thereof is unnecessary. Neglecting for a moment the specific operation of unit 16, the negatively modulated carrier wave signal desired is intercepted by antenna system 10 of the television receiver. This signal is selected and amplified in radio-frequency tuner 11 and converted to an intermediate-frequency signal. Intermediate-frequency amplifier 12 amplifies this signal and impresses it upon detector 13, deriving the modulation components thereof. These modulation components, comprising an image-representative portion as well as a synchronizing portion, are applied to video amplifier 14 for amplification and then are coupled to cathode-ray tube 15 for reproduction.

The synchronizing signal components of the detected signal are separated from the video-frequency components in synchronizing signal separator 18 and are used to synchronize field-frequency generator and line-frequency generator, 19 and 20, respectively. These generators produce signals of sawtooth waveform which are properly synchronized with respect to the received television picture signal and are applied to the field-frequency and line-frequency scanning coils, respectively, to deflect the beam in two directions normal to each other, to reproduce the received television image.

The amplified demodulation components from unit 14 are also applied to input terminal 25 of control apparatus 16 wherein, in conjunction with the horizontal scanning system output signal from terminal 23 of line-frequency generator 20, the output signal thereof, modified in a manner to be described subsequently, is employed to control the degree of amplification of units 11 and 12 such that the signal presented to detector 13 is maintained within a narrow intensity range for a wide range of received television signal intensities and, more particularly, so that black level is maintained in the reproduced image.

Accompanying the television picture modulated carrier wave is a sound signal modulated carrier wave which is also intercepted by antenna system 10. This sound signal is selected, amplified, and converted to an intermediate-frequency signal in radio-frequency tuner 11. Intermediate-frequency amplifier 12 amplifies the sound modulated signal and impresses it upon detector 13, wherein a sound modulated intercarrier beat-note component is derived. This derived signal is then presented to sound-reproducing apparatus 24 wherein it is amplified, detected, and reproduced by the sound-reproducing device.

*Control apparatus of FIG. 1*

Referring now more particularly to control apparatus 16 which embodies one form of the present invention, the arrangement there represented comprises means for supplying at least the reference level of the television signal. This level, which follows the synchronizing pulse portion of the television signal and which precedes the image-representative portion, is known as the blanking level, and is a level of intensity at which the image-reproducing device should be cut off, i.e. at which its electron beam should be extinguished. This means comprises the output circuit of video amplifier 14 for supplying a video signal. Horizontal deflection signal generating means are also included for supplying flyback pulses of a relatively long duration synchronized by, and approximately in phase with, the synchronizing pulses. These flyback pulses are derived from transformer 26 of the horizontal sweep output circuit of line-frequency generator 20 and are applied through input terminal 27 to the integrator circuit consisting of resistor 28, capacitor 29, resistor 30, and capacitor 31. This circuit constitutes a means for delaying each flyback pulse, the delayed pulse appearing at the junction of resistor 30 and capacitor 31. Means responsive to the reference level and to predetermined amplitude portions of the supplied and delayed flyback pulses for deriving an automatic-gain-control effect from the reference level is also included in appartus 16. Such means includes the keyed rectifier circuit 32 having a pentode type of vacuum tube 17, the control grid of which is D.-C. coupled to amplifier 14 through resistor 33 and input terminal 25. Besides supplying the reference level, amplifier 14 also supplies the synchronizing pulses that immediately precede it, the pulses extending from that level in a positive direction. The delayed flyback pulse at the junction of resistor 30 and capacitor 31 and the flyback pulse at input terminal 27 are coupled to the screen grid and anode of vacuum tube 17, respectively. Furthermore, these pulses extend in such a direction as to aid conduction in vacuum tube 17. The usual cathode biasing network consisting of resistors 34 and 35, bypass capacitor 36, and voltage supply +V is also included. These interconnections allow for rendering vacuum tube 17 conducting when the leading edge of the delayed flyback pulse applied to the screen grid passes through a predetermined level, the potential established at the cathode by the cathode biasing network, and rendering vacuum tube 17 nonconducting when the trailing edge of the supplied flyback pulse applied to the anode passes through the predetermined level. The automatic-gain-control effect, derived during the conduction period of tube 17, is applied to radio-frequency tuner 11 and intermediate-frequency amplifier 12 for adjusting the bias voltage therein. This is accomplished by connecting the output circuit of vacuum tube 17 to radio-frequency tuner 11 and intermediate-frequency amplifier 12, and includes transformer 26 and resistor 37 for tuner 11, and transformer 26 and voltage divider resistors 38 and 39 for amplifier 12. Bypass capacitors 40 and 41 are included to prevent rapidly varying signals from changing the bias voltage levels prescribed by the automatic-gain-control effect. As a result, the reference level within the image-reproducing apparatus is stabilized at a level corresponding to that required for correct black level operation at image-reproducing device 15.

The manner in which control apparatus 16 is connected within the receiver, i.e. direct-current coupled from video detector 13 to image tube 15, allows for maintaining correct black-level operation at the image-reproducing device by effectively neglecting the synchronizing pulses and deriving the automatic-gain-control effect from the reference level that follows.

In operation, the amplified demodulated picture carrier or video signal output of video amplifier 14, waveform A in FIG. 2, is coupled to the control grid of vacuum tube 17 through input terminal 25 and resistor 33. This signal is also applied to synchronizing signal separator 18 which selects the synchronizing signals from the other modulation components present, amplifies them, and impresses them upon line-frequency generator 20. The keying or flyback pulses derived from a winding on horizontal output transformer 26 thereof are positive-going pulses, one of which is shown in FIG. 2 as waveform B. In this circuit, flyback pulses are applied to both plate and screen grid of tube 17. However, the pulse applied to the plate is applied directly, whereas the screen pulse is delayed by network resistor 28, capacitor 29, resistor 30, and capacitor 31 and appears as waveform C in FIG. 2. Since both plate and screen of tube 17 are keyed, the relative timing of the two pulses determines the time of plate current flow. It will be noted that the screen pulse, waveform C in FIG. 2, is delayed sufficiently so that it does not go positive with respect to cathode potential, waveform D in FIG. 2, until time $t_1$ whereupon the synchronizing pulse portion is completed and the "back porch" portion has begun. Thus, plate current is not permitted to flow during the horizontal synchronizing pulse. However, the screen pulse is long in duration and extends well into the image-representative portion of the television signal. Plate conduction during the image-representative portion is prevented by the timing of the plate pulse, FIG. 2, waveform B. The plate potential falls below the cathode potential, FIG. 2, waveform D, at about the same time $t_2$ as when the "back porch" ends. Thus the time $t_1$ of the start of plate current flow is determined by the screen pulse, and the time $t_2$ of termination is determined by the plate pulse. The horizontal synchronizing pulses do not interfere with keying action and the automatic-gain-control effect is derived during the "back porch" or blanking level, rather than on synchronizing pulse peaks.

While applicant does not wish to be limited to any particular set of circuit constants, the following have proved useful in control apparatus 16:

| | | |
|---|---|---|
| Resistor 28 | kilohms | 47 |
| Resistor 30 | do | 47 |
| Resistor 33 | do | 18 |
| Resistor 34 | do | 47 |
| Resistor 35 | do | 12 |
| Capacitor 29 | picofarads | 47 |
| Capacitor 31 | do | 47 |
| Capacitor 36 | microfarad | 0.1 |
| Vacuum tube 17 | | ½–5AN8 |
| Voltage supply +V | volts | 265 |
| Cathode-ray tube 15 | | 21DEP4A |

*Control apparatus 316*

In FIG. 3 there is shown an alternative form of control apparatus 316 useful in the television receiver of FIG. 1. The arrangement there represented differs from apparatus 16 in that delay is provided in both the plate and screen circuits of the keyed tube and not in the screen circuit alone. As will be described hereinafter, apparatus 316 operates similarly to apparatus 16, and as such, those components that have the same function and value in apparatus 316 as in apparatus 16 are represented in apparatus 316 by the same reference numerals as in apparatus 16.

With respect to FIG. 3, the flyback pulse derived from transformer 26 of the horizontal sweep output circuit of line-frequency generator 20 is applied through input terminal 27 to the circuit consisting of resistor 42, inductor 43, and capacitor 44. This circuit constitutes a first means for delaying each flyback pulse, the delayed pulse appearing at the junction of inductor 43 and capacitor 44. Capacitor 45 and resistor 46 couple this delayed pulse to the integrator circuit, resistor 47 and capacitor 48. This circuit comprises a second means for further delaying each flyback pulse signal, this second delayed signal appearing at the common point of resistor 47 and capacitor 48. Means responsive to the reference level and to predetermined amplitude portions of the first and second delayed flyback pulses for deriving an automatic-gain-control effect from the reference level is also included in apparatus 316. Such means includes a keyed rectifier circuit 50 having a pentode type of vacuum tube 17, the control grid of which is D.-C. coupled to amplifier 14 through resistor 33 and input terminal 25. The first delayed flyback pulse at the junction of inductor 43 and capacitor 44 and the second delayed flyback pulse at the common point of resistor 47 and capacitor 48 are coupled to the anode and screen grid of vacuum tube 17, respectively. These interconnections allow for rendering vacuum tube 17 conducting when the leading edge of the second delayed flyback pulse, applied to the screen grid, passes through a predetermined level, cathode potential; and rendering vacuum tube 17 nonconducting when the trailing edge of the first delayed flyback pulse, applied to the anode, passes through the predetermined level.

FIG. 4 shows the keying waveforms relative to the cathode potential of keyed tube 17, ground potential, and the video signal input to the control grid of tube 17. Plate conduction, in accordance with applied video signal A′, can occur only when the plate pulse B′ and screen pulse C′ are both positive with respect to cathode potential D′, namely between times $t_1$ and $t_2$. Investigation of these waveforms illustrates that the time $t_1$ of the start of plate current flow is determined by the screen pulse, the time $t_2$ of termination is determined by the plate pulse, and conduction occurs only during the "back porch," thereby deriving the AGC effect from the reference level. The plate pulse may be delayed such that it extends slightly into the picture region before it falls below cathode potential, so as to provide adequate conduction angle and plate pulse amplitude during the "back porch" period, to prevent AGC overload effects.

With "back porch" AGC keying, there is the possibility of producing an A.-C. voltage component on the AGC line by virtue of the fact that the keyer will key on sync tips during vertical synchronization. However, by adjusting the cathode potential of the keyed tube so that the "back porch" portion of the signal at the grid is at approximately the same potential with respect to the cathode as occurs on sync tip in the normal sync tip keying circuit, this troublesome upset is avoided. This results because synchronizing peaks tend to drive the grid positive with respect to the cathode but are limited by the flow of grid current in resistor 33. Another manner in which apparatus 316 avoids this upset is by employing a high impedance coupling circuit in the screen circuit. During vertical sync, the regulation effect is such that the amplitude of the screen keying pulse is decreased, thereby limiting the effect of vertical sync on the plate current.

While applicant does not wish to be limited to any particular set of circuit constants, the following have proved useful in control apparatus 316:

| | | |
|---|---|---|
| Resistor 42 | kilohms | 6.8 |
| Resistor 46 | do | 330 |
| Resistor 47 | do | 100 |
| Resistor 49 | do | 15 |
| Capacitor 44 | picofarads | 150 |
| Capacitor 45 | do | 5000 |
| Capacitor 48 | do | 43 |
| Inductor 43 | millihenries | 20 |
| Voltage supply +V | volts | 265 |
| Cathode-ray tube 15 | | 21 DEP4A |

If synchronizing pulse peak referencing and full D.-C. coupling are employed in a television receiver in which AGC is derived from simple means, which may have a nonflat AGC characteristic, two problems are created which should be corrected if comfortable viewing is to result. These relate to high voltage power supply overload on high average brightness scenes, particularly when receiving strong signals, and sync to blanking level drift with signal level. Through the use of special coupling network 51, high voltage power supply overload effects can be minimized, however, since for conditions producing large power supply drain the coupling arrangement approximates that of A.-C. coupling. The problem of undesirable drift of black with signal level can also be minimized if a D.-C. restoration effect is derived from the "back porch" rather than from the synchronizing pulse peaks. Thus, a less perfect AGC characteristic can be used and still maintain black level constant if the "back porch" referencing system described herein is used to provide merely a D.-C. restoration function instead of the combined blanking level stabilization function and AGC function as in the previous embodiments.

As such, apparatus 16 or apparatus 316 may be connected as a direct-current restorer in the television receiver of FIG. 1 to derive a different type of control effect from the reference level. Such an arrangement is more fully described in copending application, Serial No. 223,493, filed September 13, 1962, now abandoned, and entitled "Control Apparatus for a Television Receiver." However, the keyed rectifier vacuum tube, shown therein as a triode, will have to be modified to be of a pentode configuration.

As in the two embodiments just described, the time of the start of keyed tube plate current flow is determined by the screen pulse and the termination determined by the plate pulse. Therefore, conduction occurs only during the "back porch" interval and the control effect is derived from the reference level. However, in the D.-C. restorer embodiment this control effect is not used to maintain the intensity of the signal presented to detector 13 constant, but is used to vary the bias on video amplifier 14, thereby producing a compensating action to counteract any changes in the transmitted picture signal. As a result, the reference level is stabilized at a level corresponding to that which is required for correct black level operation at image-reproducing device 15, i.e. black in the image will be reproduced at that level which was transmitted.

The flyback pulses derived from horizontal scanning system of generator 20 are synchronized by, and are approximately in phase with, the synchronizing pulses. They are of a relatively long duration and extend almost the entire width of the blanking interval, i.e., from almost the beginning of the "front porch" interval to almost the end of the "back porch" interval. A prior art method utilizing multivibrator and pulse amplifier circuitry might be employed to delay and narrow the flyback pulse so that the control effect is derived from the reference level following the synchronizing pulses. Such a method adds to the cost of the receiver. This disadvantage does not appear however, when practicing the invention in the manner described in this application.

Waveforms E′–H′ in FIG. 5*b* derived from a television receiver utilizing the present invention show that the troublesome black level variations that were inherent in the operation of the conventional sync tip keyed AGC circuits, as shown by the waveforms E–H of FIG. 5*a*, have been eliminated. Thus, the viewer is freed of the necessity of frequently adjusting the brightness control. It is believed that this is a great advantage, since proper adjustment of the brightness control by the average consumer seems to be somewhat more difficult to achieve in a receiver with D.-C. restoration or coupling than in an A.-C. coupled receiver.

While there have been described what are, at present, considered to be the preferred embodiments of this invention, it will be obvious to those skilled in the art that various changes and modifications may be made therein without departing from the invention, and it, is, therefore, aimed to cover all such changes and modifications as fall within the true spirit and scope of the invention.

What is claimed is:

1. Control apparatus for a television receiver of the type adapted to receive a negative modulation television signal including synchronizing pulses followed by a reference level having an amplitude different from that of said pulses and having image-reproducing apparatus including a signal-translating channel and an image-reproducing device, said control apparatus comprising:

means for supplying at least the reference level of said signal;

horizontal deflection signal generating means for supplying flyback pulses;

differential delay means for deriving from each of said flyback pulses at least two pulses, wherein the phase of one derived pulse is delayed with respect to the phase of the other derived pulse;

and means responsive to said reference level and to each of said differentially delayed pulses for deriving an automatic-control effect representative of adjustments required to stabilize the reference level within said image-reproducing apparatus at a level corresponding to that which is required for correct black level operation at the image-reproducing device.

2. Control apparatus in accordance with claim 1, wherein the last-described means responds to said reference level only during periods of time coincidence between said differentially delayed pulses and the control effect derived is representative of said reference level.

3. Control apparatus in accordance with claim 1, wherein the last-described means includes a rectifier circuit rendered conductive only during periods of time coincidence between said differentially delayed pulses and said means derives the control effect from a sample of said reference level obtained during said conductive periods.

4. Control apparatus for a television receiver of the type adapted to receive a negative modulation television signal including synchronizing pulses followed by a reference level having an amplitude different from that of said pulses and having image-reproducing apparatus including a signal-translating channel and an image-reproducing device, said control apparatus comprising:

means for supplying at least the reference level of said signal;

horizontal deflection signal generating means for supply flyback pulses;

integrator circuit means for delaying said flyback pulses to develop delayed flyback pulses;

and means responsive to said reference level and to predetermined amplitude portions of said supplied and said delayed flyback pulses for deriving an automatic-control effect representative of adjustments required to stabilize the reference level within said image-reproducing apparatus at a level corresponding to that which is required for correct black level operation at the image-reproducing device.

5. Control apparatus in accordance with claim 4, wherein the last-described means responds to said reference level only during periods of time coincidence between said supplied and delayed flyback pulses and derives the control effect from a sample of said reference level obtained during said periods.

6. Control apparatus in accordance with claim 5, wherein the last-described means includes a keyed rectifier circuit having a pentode-type vacuum tube, the control grid, anode, and screen grid of which are connected to said reference level supplying means, flyback pulse supplying means, and flyback pulse delaying means, respectively.

7. Control apparatus for a television receiver of the type adapted to receive a negative modulation television signal including synchronizing pulses immediately followed by a reference level having an amplitude different from that of said pulses from which said pulses extend in a positive direction and having image-reproducing apparatus including a signal-translating channel and an image-reproducing device, said control apparatus comprising:

means for supplying at least the reference level of said signal;

horizontal deflection signal generating means for supplying flyback pulses;

integrator circuit means for delaying said flyback pulses to develop delayed flyback pulses;

and means responsive to said reference level and to predetermined amplitude portions of said supplied and said delayed flyback pulses, including a keyed rectifier circuit having a vacuum tube, for deriving an automatic-gain-control effect wherein said tube is rendered conducting by the leading edge of said delayed flyback pulses passing through a predetermined level and is rendered nonconducting by the trailing edge of said flyback pulses passing through the predetermined level before the trailing edge of said delayed flyback pulse repasses through said predetermined level representative of adjustments required to stabilize the reference level within said image-reproducing apparatus at a level corresponding to that which is required for correct black level operation at the image-reproducing device.

8. Control apparatus for a television receiver of the type adapted to receive a negative modulation television signal including synchronizing pulses immediately followed by a reference level having an amplitude different from that of said pulses and having image-reproducing apparatus including a signal-translating channel and an image-reproducing device, said control apparatus comprising:

means for supplying at least the reference level of said signal;

horizontal deflection signal generating means for supplying flyback pulses;

a first means for delaying said flyback pulses to develop first delayed flyback pulses;

a second means for further delaying said flyback pulses to develop second delayed flyback pulses;

and means responsive to said reference level and to predetermined amplitude portions of said first and second delayed flyback pulses for deriving an automatic-control effect representative of adjustments required to stabilize the reference level within said image-reproducing apparatus at a level corresponding to that which is required for correct black level operation at the image-reproducing device.

9. Control apparatus in accordance with claim 8, wherein said first and second delay means are integrator circuits for developing said first and second delayed flyback pulses.

10. Control apparatus in accordance with claim 8, wherein the last-described means responds to said reference level only during periods of time coincidence between said first and second delayed flyback pulses and derives the control effect from a sample of said reference level obtained during said periods.

11. Control apparatus in accordance with claim 10, wherein the last-described means includes a keyed rectifier circuit having a pentode-type vacuum tube, the control grid, anode, and screen grid of which are connected to said reference level supplying means, flyback pulse supplying means, and flyback pulse delaying means, respectively.

12. Control apparatus for a television receiver of the type adapted to receive a negative modulation television signal including synchronizing pulses immediately followed by a reference level having an amplitude different from that of said pulses from which said pulses extend in a positive direction and having image-reproducing apparatus including a signal-translating channel and an image-reproducing device, said control apparatus comprising:

means for supplying at least the reference level of said signal;

horizontal deflection signal generating means for supplying flyback pulses;

a first means for delaying said flyback pulses to develop first delayed flyback pulses;

a second means for further delaying said flyback pulses to develop second delayed flyback pulses;

and means responsive to said reference level and to predetermined amplitude portions of said first and second delay flyback pulses, including a keyed rectifier circuit having a vacuum tube, for deriving an automatic-gain-control effect wherein said tube is rendered conducting by the leading edge of said second delayed flyback pulse passing through a predetermined level and is rendered nonconducting by the trailing edge of said first delayed flyback pulse passing through the predetermined level before the trailing edge of said second delayed flyback pulse repasses through said predetermined level representative of adjustments required to stabilize the reference level with said image-reproducing apparatus at a level corresponding to that which is required for correct black level operation at the image-reproducing device.

References Cited by the Examiner

UNITED STATES PATENTS

| | | | |
|---|---|---|---|
| 2,227,056 | 12/1940 | Blumlein et al. | 178—7.3 |
| 2,875,277 | 2/1959 | Cope et al. | 178—7.3 |

DAVID G. REDINBAUGH, *Primary Examiner*.